United States Patent
Wang et al.

(10) Patent No.: US 12,441,447 B2
(45) Date of Patent: Oct. 14, 2025

(54) SMART SOFT ACTUATION UNIT FOR UNDERWATER APPLICATIONS

(71) Applicant: VERSITECH LIMITED, Hong Kong (HK)

(72) Inventors: Zheng Wang, Hong Kong (HK); Zhong Shen, Hong Kong (HK); Yafei Zhao, Hong Kong (HK)

(73) Assignee: VERSITECH LIMITED, Hong Kong (HK)

( * ) Notice: Subject to any disclaimer, the term of this patent is extended or adjusted under 35 U.S.C. 154(b) by 279 days.

(21) Appl. No.: 17/920,813

(22) PCT Filed: Mar. 22, 2021

(86) PCT No.: PCT/CN2021/082048
§ 371 (c)(1),
(2) Date: Oct. 24, 2022

(87) PCT Pub. No.: WO2021/218487
PCT Pub. Date: Nov. 4, 2021

(65) Prior Publication Data
US 2023/0159144 A1 May 25, 2023

Related U.S. Application Data

(60) Provisional application No. 63/017,680, filed on Apr. 30, 2020.

(51) Int. Cl.
*B63C 11/52* (2006.01)
*B25J 15/00* (2006.01)
*B25J 19/02* (2006.01)

(52) U.S. Cl.
CPC ........... *B63C 11/52* (2013.01); *B25J 15/0023* (2013.01); *B25J 19/021* (2013.01)

(58) Field of Classification Search
CPC ...... B63C 11/52; B25J 15/0023; B25J 19/021
See application file for complete search history.

(56) References Cited

U.S. PATENT DOCUMENTS

| | | | |
|---|---|---|---|
| 2014/0208731 A1* | 7/2014 | Shepherd | B25J 9/1075 60/407 |
| 2018/0188125 A1* | 7/2018 | Park | B29D 11/00875 |
| 2018/0297214 A1* | 10/2018 | Lessing | B25J 9/142 |
| 2019/0056248 A1* | 2/2019 | Shepherd | B25J 13/081 |
| 2022/0218500 A1* | 7/2022 | Shepherd | A61F 2/74 |

OTHER PUBLICATIONS

Paez et al. (Sep. 2016). "Design and Analysis of a Soft Pneumatic Actuator with Origami Shell Reinforcement" Soft Robotics. 3. 10.1089/soro.2016.0023 (Year: 2016).*
International Search Report, Written Opinion and International Preliminary Report for International Application No. PCT/CN2021/082048 mailed on Jun. 30, 2021, 12 pages.

* cited by examiner

*Primary Examiner* — Jaime Figueroa
*Assistant Examiner* — Jerrod Irvin Davis
(74) *Attorney, Agent, or Firm* — Amin, Turocy & Watson, LLP

(57) ABSTRACT

Disclosed are soft origami actuators with embedded optical waveguides and underwater manipulator applications.

20 Claims, 13 Drawing Sheets

SMART SOFT ACTUATION UNIT FOR UNDERWATER APPLICATIONS

TECHNICAL FIELD

Disclosed are soft origami actuators with embedded optical waveguides and underwater manipulator applications.

BACKGROUND

Underwater manipulators are often used for the scientific study of marine life. Soft robotics provide a new approach compared with rigid compared with conventional rigid-bodied robots. In particular, the inherent adaptation and waterproofing of soft actuators are ideal for grabbing delicate and flexible objects underwater inherited from cable driven and biomimetic approaches. Fluidic elastomer actuators (FEAs) also work well in underwater applications, in terms of continuum structures, hybrid structures.

Although soft robotics have many advantages, one of the main challenges is reliable sensing feedback. Many standard non-deformable sensing technologies are inapplicable, giving the highly flexibility of soft materials. In this case, soft strain sensors are developed as they can undergo the same motion as soft actuators. Examples are resistance strain sensors, capacitance strain sensors, and optical waveguide sensors. Many of the reported work exhibited accuracy, robustness and reliability, showing potential in this field.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

Soft robots are ideal for underwater manipulation towards sampling and other servicing applications. Their unique features of compliance, adaptation, and naturally waterproof, enable robotic designs to be compact, lightweight, while achieving uncompromised dexterity and flexibility. However, the inherent flexibility and high nonlinearity of soft materials also make it very challenging for acquiring sensory feedback for closed-loop control of soft robots, especially under the highly dynamic underwater environments. A popular remedy to this problem is by employing soft strain sensors to measure soft robot deformation, but they are also prone to the strong coupling of bending and stretching due to soft material characteristics. Herein, a novel sensorized soft actuator "SOFA" is proposed, based on origamic soft actuator structure and dedicated soft optical waveguide sensors. The SOFA design brings two major advantages over state-of-the-art approaches: 1) decoupling of bending and stretching motions of the actuator, by strategical geometrical design, significantly improving positional measurement performance under complex actuator motion conditions; and 2) removal of the external cladding layer of the optical sensor by exploiting interfacing effects between the sensor's soft material and ambient water, significantly reducing fabrication complexity and enabling new sensing modes of bending motions. A hybrid underwater manipulator of 3-DOF and an omnidirectional underwater platform of 6 DOFs and 7 propellors have been developed to showcase the performances of the proposed SOFA actuator, with experimental results presented using the fabricated prototypes.

In one embodiment, described herein are devices for underwater applications made of a photodiode tube; an LED tube; a soft origami fluidic actuator between the photodiode tube and LED tube; a plurality of optical waveguides configured to follow motion of the soft origami fluidic actuator; and a plurality of sensors.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

The motion of many soft robots are realized by stretching/bending of soft actuators, stretching and bending take place simultaneously most of the time. One concern is that as the soft strain sensors are bound with soft actuators, stretching and bending are measured at the same time as they both have affect on the output signal of soft sensors.

Figure 1:
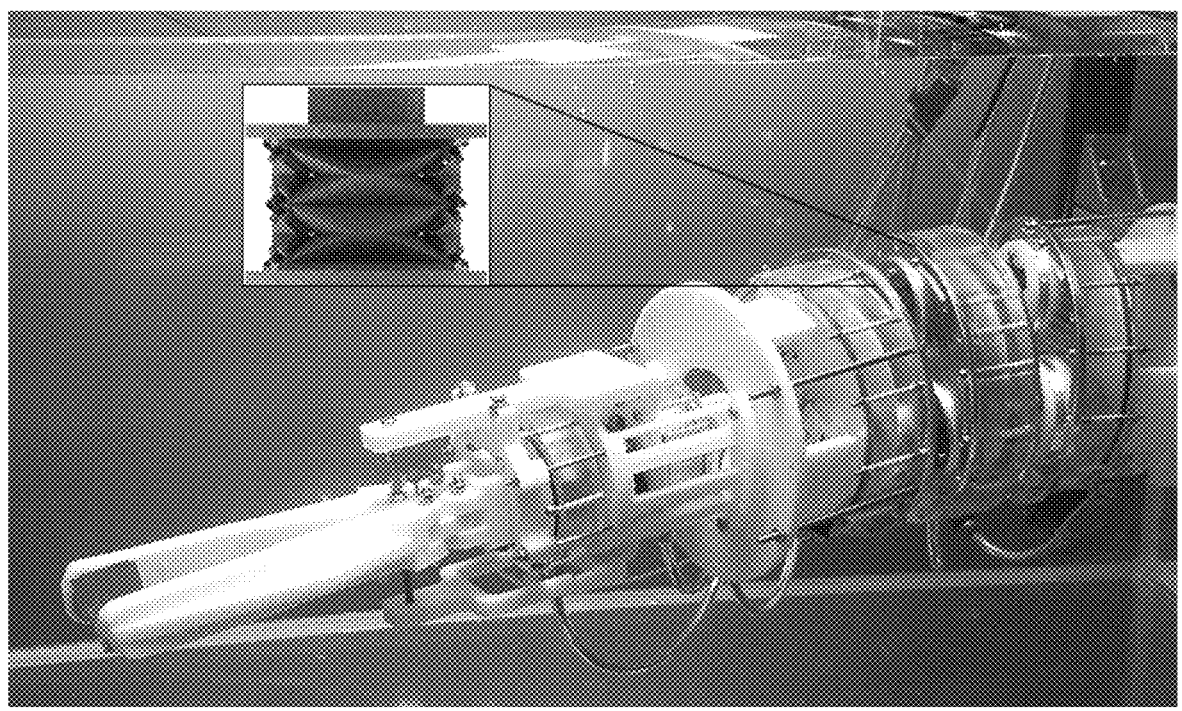
FIG. 1 depicts an underwater manipulator and the soft origami fluidic actuator with embedded optical waveguide in accordance with an embodiment.

As described herein, an underwater manipulator actuated by soft origami fluidic actuator with embedded optical waveguide (SOFA) is provided, as shown for example in FIG. 1 to tackle the coupling issue. Three special designed optical soft waveguides are embedded in each soft origami actuator, with photodiodes and LEDs placed on top and bottom for sensory feedback. An underwater manipulator with a gripper is also presented, actuated with the same soft origami actuators. The main contributions of this disclosure include: 1) coupling of stretching and bending are eliminated by combing origami soft actuators and special designed optical waveguide; 2) the optical waveguide is designed such that no cladding is needed which largely reduces fabrication complexity; and 3) a new hybrid underwater manipulator is described, with redundant position feedback for accuracy and dexterous underwater applications.

Design Concept

The devices and methods herein provide at least one of three advantages: a) providing a feedback solution for soft actuators for underwater manipulation applications; b) allowing the sensing methodology to measure bending and stretching separately; and c) allowing the sensor to be robust, accurate, and easy to fabricate. For the first advantage, as waterproofing is a critical issue in underwater applications, an optical waveguide is employed, as only the soft waveguide needs to be exposed to water, all the electronics can be separated and well sealed, which largely reduces system design complexity.

Figure 2A:
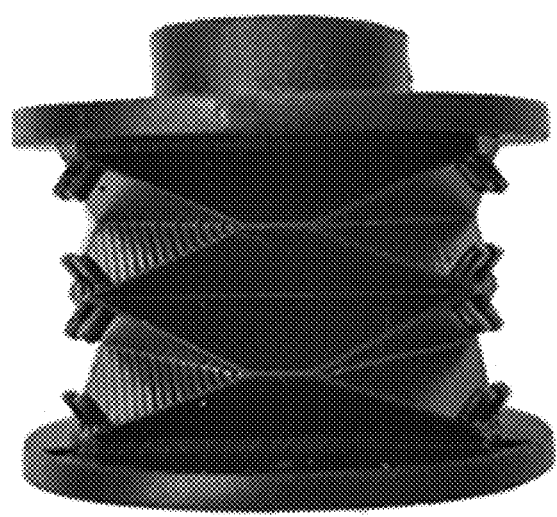
FIG. 2a depicts a soft origami fluidic actuator in accordance with an embodiment.
Figure 2B:
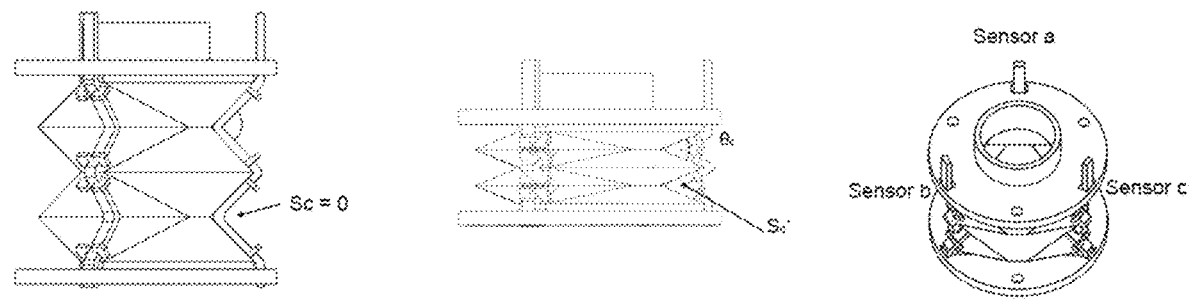
FIG. 2b depicts three schematic drawings of SOFA. Sc is the contact area between upper and lower surface of the optical waveguide in accordance with an embodiment.

The second advantage is to decouple bending and stretching in two levels: 1) actuator level and 2) sensor level. Firstly, a soft origami actuator shown in FIG. 2a is developed. Contraction and elongation can be easily realized by the unique folding structure. Also, double bidirectional motion can be realized by different combinations of critical angle θc (FIG. 2b). Compared with traditional FEAs, when the proposed soft origami actuator is bent, only the critical angle is changed, stretching of the actuator is negligible (wall thickness <0.7 mm). In this case, bending and stretching are decoupled in the actuator level. Secondly, the optical waveguide is designed such that it can be passed closely to the soft origami actuator. The pre-molded buckling structure also ensures that the optical waveguide can follow the motion of the soft origami actuator. In this case, bending and stretching are decoupled in the sensor level.

Normally optical waveguide needs at least two layers: one core layer to transmit light and one cladding layer to provide lower refractive index and protection for core layer. This method is very well developed, but the fabrication process is very complex, especially when making soft waveguide. In this case, some modification are made based on the following aspects:

1) There is only one layer for the waveguide molded using silicone rubber. The material's refractive index is larger than water (1.33) and water is considered as the cladding layer. In this case, the fabrication process of the optical waveguide can be simplified.

2) As shown in FIG. 2b, as the critical angle becomes smaller, the upper and lower surface of the optical waveguide will have more contact area Sc. This area provides a "shortcut" for the light, as the light can propagate straight towards the photodiode. In this case, the smaller the critical angle, the larger the photodiode's output will be.

Fabrication Process

The soft origami actuator is shown in FIG. 2a. It is fabricated by injection molding with a wall thickness of 0.7 mm. Each actuator has, for example, three optical waveguide paths and corresponding housing mechanism for mounting the soft waveguides. The bottom side of the actuator is permanently sealed while the top side has a sealing sleeve as inlet & outlet.

Figure 2C:
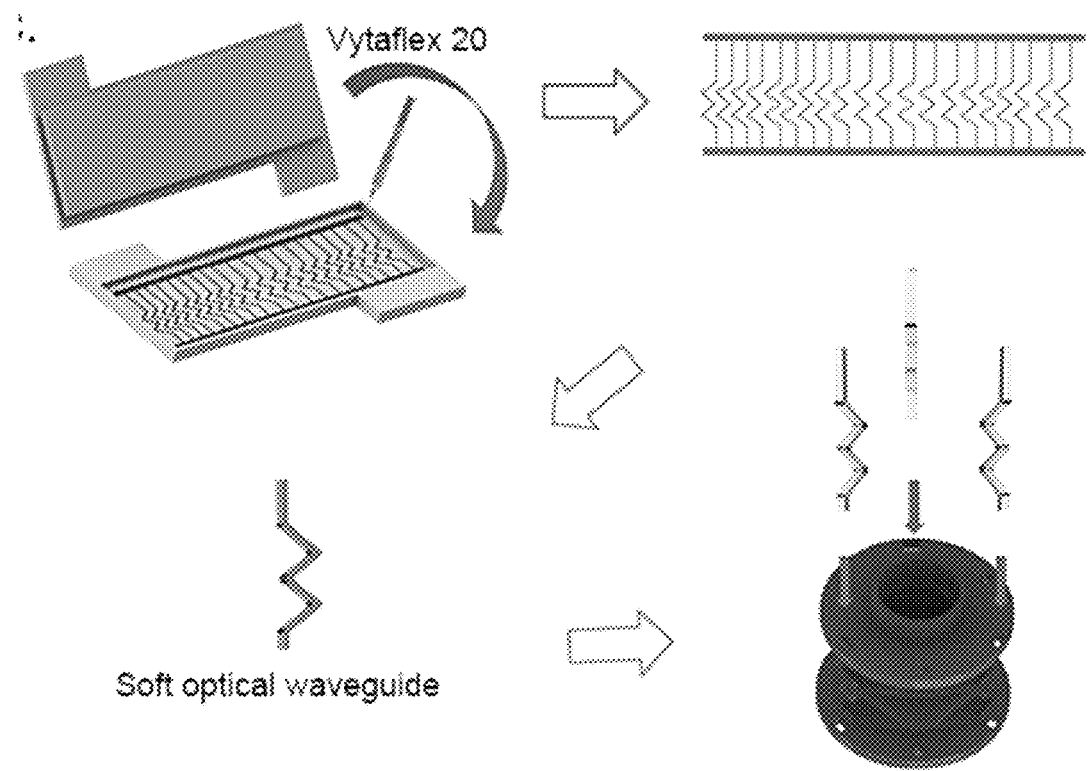
FIG. 2c depicts an example of a soft optical waveguide fabrication process in accordance with an embodiment.

The fabrication process of the soft waveguide is shown in FIG. 2c. A transparent silicone rubber (VytaFlex 20, Smooth-On Inc) (n=1.461) is chosen as the soft waveguide material. The mold is first 3D printed and silicone rubber is injected into the mold. After the silicone is cured, the soft waveguide is removed from the mold and cut into the desired shape. At last, three soft optical waveguides are placed onto the soft origami actuator.

Figure 2D:
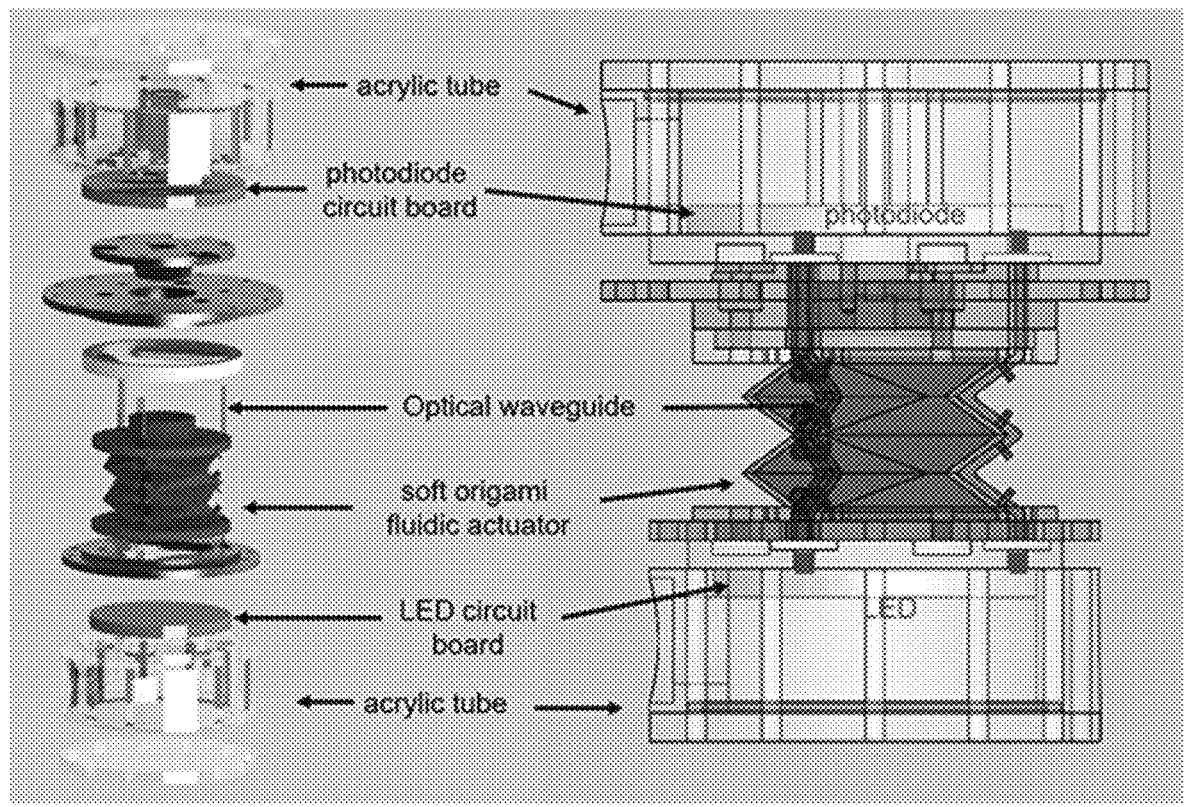
FIG. 2d depicts a SOFA exposed view and assembly in accordance with an embodiment.

As shown in FIG. 2d, when the actuator with waveguide is ready, it is first sealed on the sealing sleeve. After that, photodiodes and LEDs are sealed separately in two acrylic tubes. The photodiodes and LEDs are placed perpendicular to the acrylic and the viewing angle of LEDs are 18° to reduce propagation loss. Then two photodiode tube and LED tube are mounted on top and bottom of the actuator.

Sensing Mechanism Validation

As described in the last section, the sensing mechanism is based on the contact area of the upper and lower surface of the optical waveguide. In order to justify the feasibility of this approach, a validation test is first carried out.

Figure 3A:
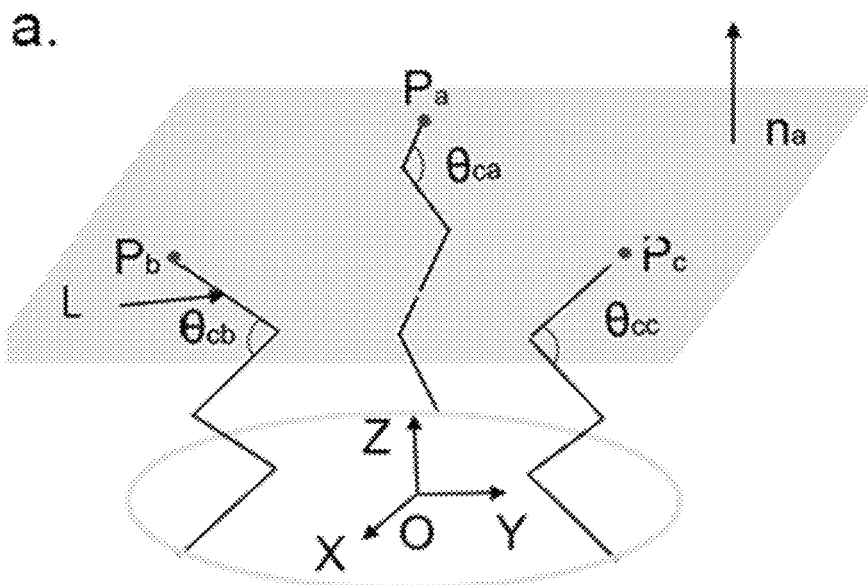
FIG. 3a depicts a schematic drawing of SOFA, illustrating the relationship between critical angle and the orientation of the actuator.
Figure 3B:
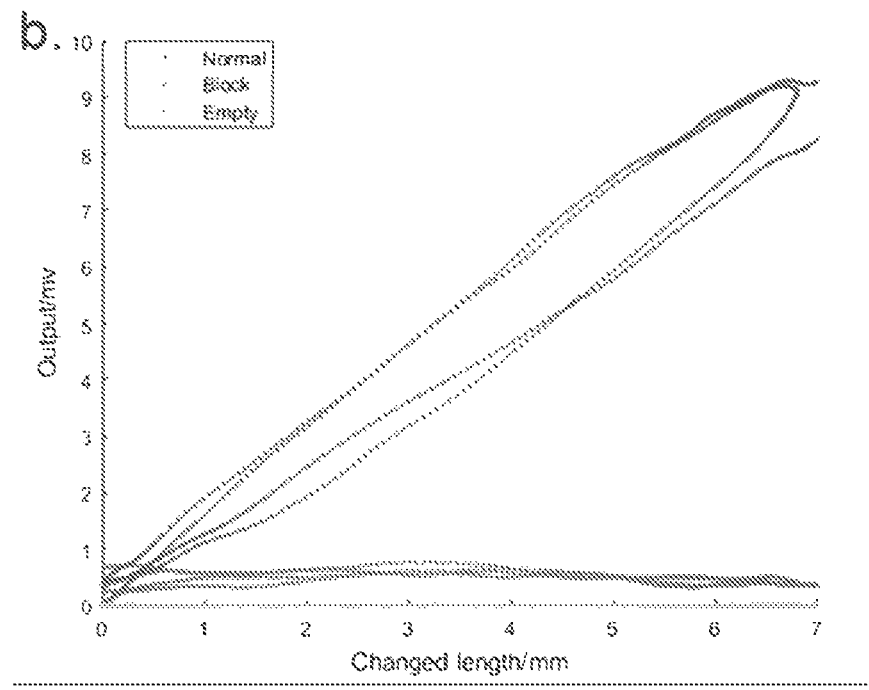
FIG. 3b is a graphical illustration of SOFA concept validation test results.
Figure 3C:
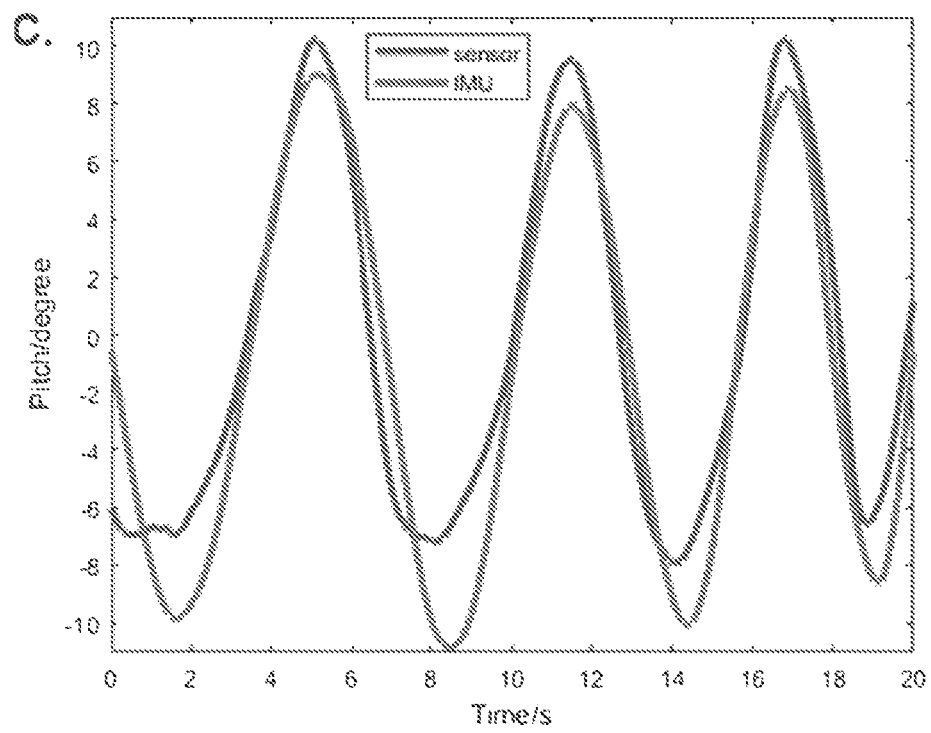
FIG. 3c is a graphical illustration of SOFA bending test results of pitch.
Figure 3D:
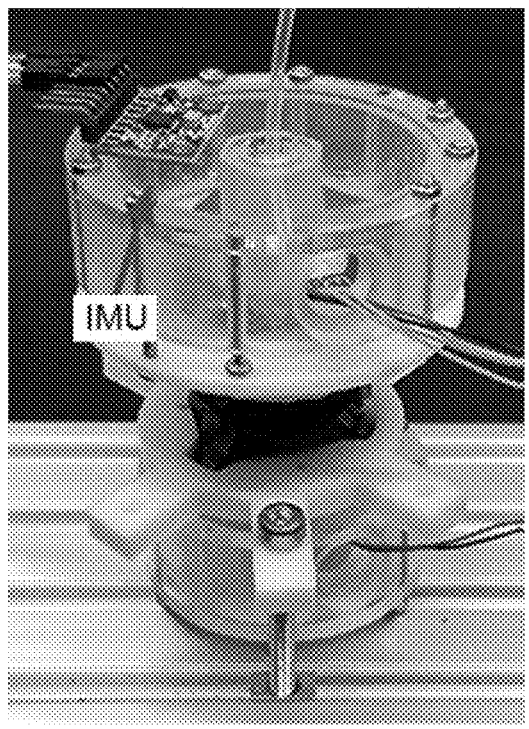
FIG. 3d depicts a SOFA bending test platform setup.
Figure 3E:
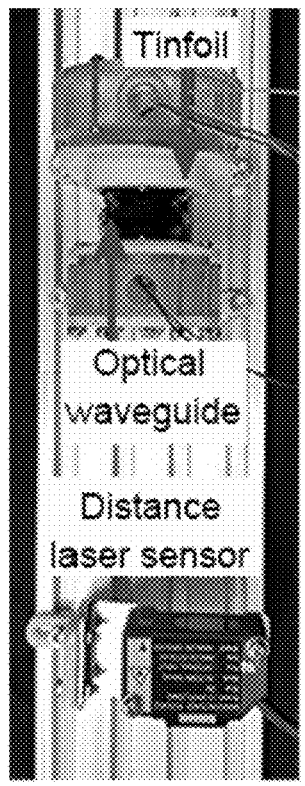
FIG. 3e depicts a SOFA concept validation test platform setup. The elongation & contraction test setup is the same, except there are three optical waveguides in the elongation & contraction test.

As shown in FIG. 3e, a SOFA is mounted at the photodiode side while the LED side can move axially. One optical waveguide is placed as usual, the other waveguide has tinfoil placed in between the upper and lower surface of the waveguide so that there is no "shortcut" when the two surface get closer. The last waveguide path is empty. A laser distance sensor (HG-C1100, Panasonic) is placed at the led side to measure changed length of the actuator. The testing results are shown in FIG. 3b. The photodiode on the empty waveguide path output. The blocked optical waveguide signal had a much smaller magnitude than the normal optical waveguide signal. In this case, one can raw a conclusion that the sensing mechanism is valid.

SOFA Elongation & Contraction Test

When the SOFA is elongated & contracted, the length of the actuator can be calculated by any of the three output signals from the three optical waveguide. As shown in FIG. 3a, the equation is:

$$H = 4L\sin\frac{\theta_c}{2} + h_0; \qquad (1)$$

θc is the critical angle, H is the length of SOFA, L is the folded edge length and $h_0$ is the initial length of SOFA. And the changed length $$\Delta H = 4L\sin\frac{\theta_c}{2} \quad (2)$$

Figure 3F:
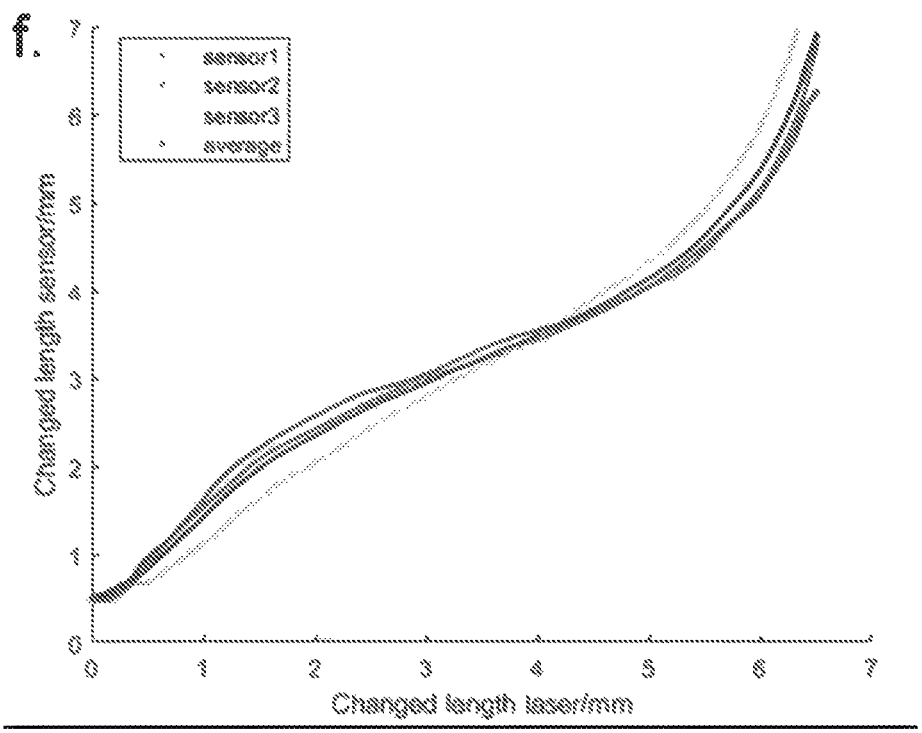
FIG. 3f reports a graphical illustration of SOFA elongation & contraction test results.

The testing platform setup was the same as last test except all three optical waveguides were properly mounted. The testing results were shown in FIG. 3f. All the data measured from optical sensors fitted well with laser measured data, the root mean square error (RMSE) was 0.59 mm, 0.56 mm, 0.5 mm and 0.47 mm for sensor1, sensor2, sensor3, and mean value of the three sensors.

SOFA Bending Test

The orientation of SOFA can also be decided giving the three critical angles. As shown in FIG. 3a, the three point Pa, Pb, Pc can be described as:

$$P_a(-L\cos\theta_{ca}, 0, L\sin\theta_{ca}); \quad (3)$$

$$P_b\left(L\cos\theta_{cb}\cos\left(\frac{\pi}{6}\right), -L\cos\theta_{cb}\sin\left(\frac{\pi}{6}\right), L\sin\theta_{cb}\right); \quad (4)$$

$$P_c\left(L\cos\theta_{cc}\cos\left(\frac{2\pi}{3}\right), L\cos\theta_{cc}\sin\left(\frac{2\pi}{3}\right), L\sin\theta_{cc}\right); \text{ and} \quad (5)$$

$$ab = P_b - P_a; \quad (6)$$

$$bc = P_c - P_b. \quad (7)$$

The normal vector is $$\vec{n}_a = ab \times bc. \quad (8)$$

Then the pitch and roll can be calculated as $$\text{pitch}_a = \arcsin\left(\frac{\vec{n}_a \cdot \vec{x}}{\|\vec{n}_a\|}\right); \quad (9)$$

$$\text{roll}_a = \arcsin\left(\frac{\vec{n}_a \cdot \vec{y}}{\|\vec{n}_a\|}\right). \quad (10)$$

Figure 3G:
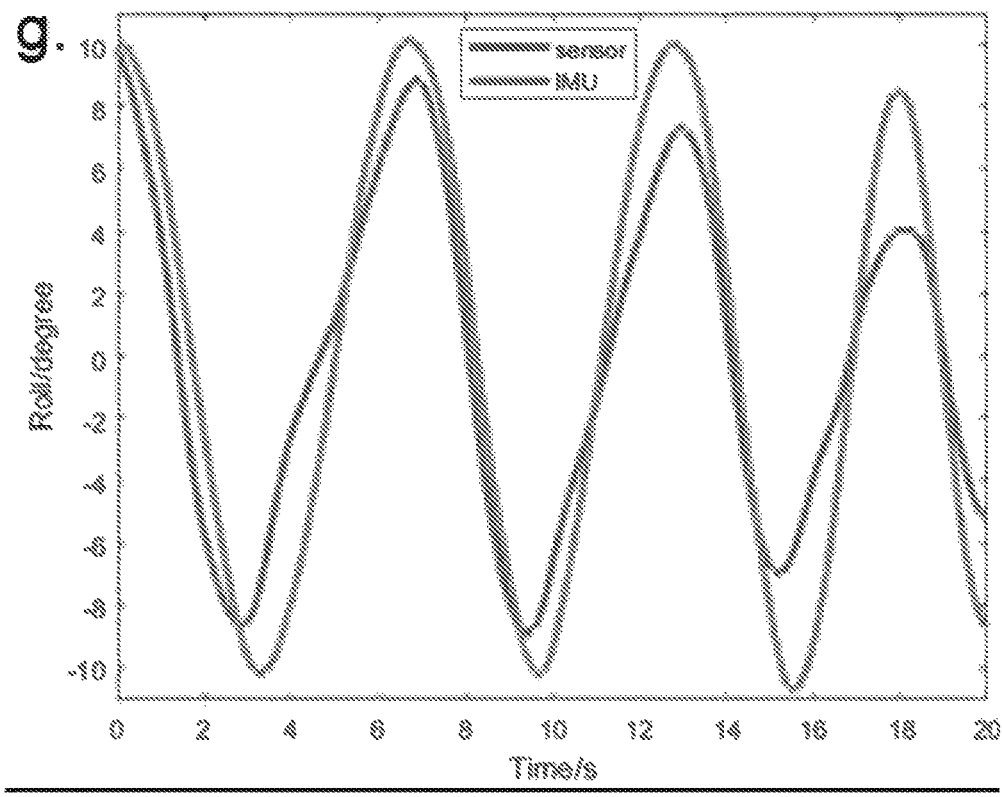
FIG. 3g reports a graphical illustration of SOFA bending test results of roll.

FIG. 3d showed the testing platform setup. A SOFA was fixed on the LED side and a 6-DOF Inertial measurement unit (IMU) was mounted on top of the photodiode tube. The actuator was rotated manually and data was captured. The testing results was shown in FIG. 3c and FIG. 3g. The RMSE of pitch is 2.2° and the RMSE of roll is 2.63°.

Manipulator Design and System Setup

Figure 4A:
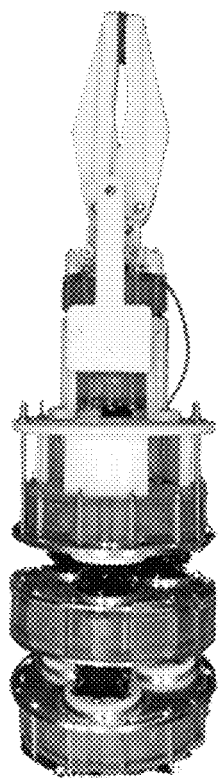
FIG. 4a depicts a hybrid underwater manipulator in accordance with an embodiment.
Figure 4B:
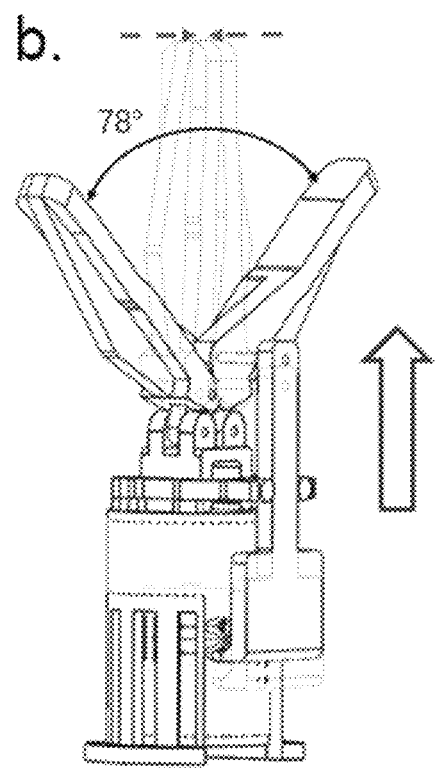
FIG. 4b Schematic drawing of the gripper. Elongation of the actuator closes the gripper.
Figure 4C:
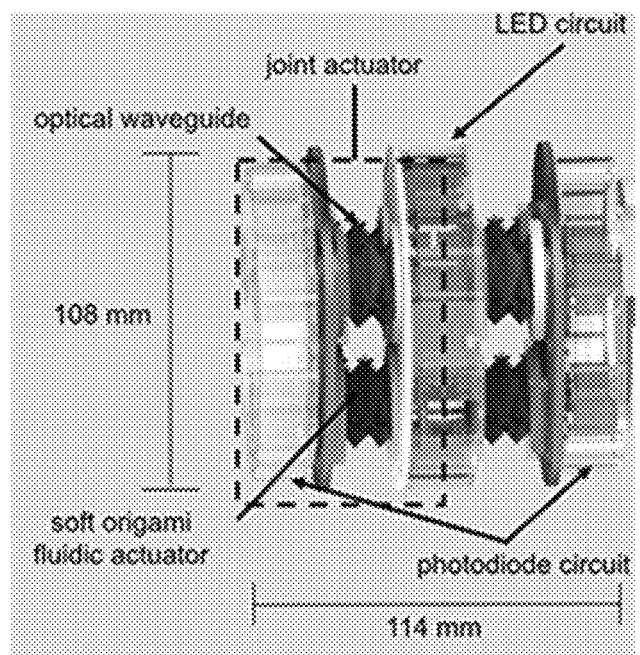
FIG. 4c depicts a hybrid underwater manipulator joint assembly in accordance with an embodiment.

Hybrid design is carried out for the underwater manipulator. On the one hand, giving complex underwater environments, soft robotics have the advantage of inherent compliance compared with conventional rigid-bodied robots. On the other hand, better accuracy and larger payload can be achieved by applying rigid parts in the design. The hybrid underwater manipulator consists of two parts: one gripper and one joint. The gripper (FIG. 4b) is actuated by one SOFA. The SOFA moves axially, the gripper will close when SOFA elongates and vise versa. The maximum opening angle is 78°. The joint has two sections, each section has three SOFAs mounted triangularly. Two photodiode circuits are sealed inside the middle acrylic tube and two LED circuits are sealed in two tubes mounted on top and bottom of the joint. The diameter of the joint is 108 mm and the height is 114 mm.

Figure 4D:
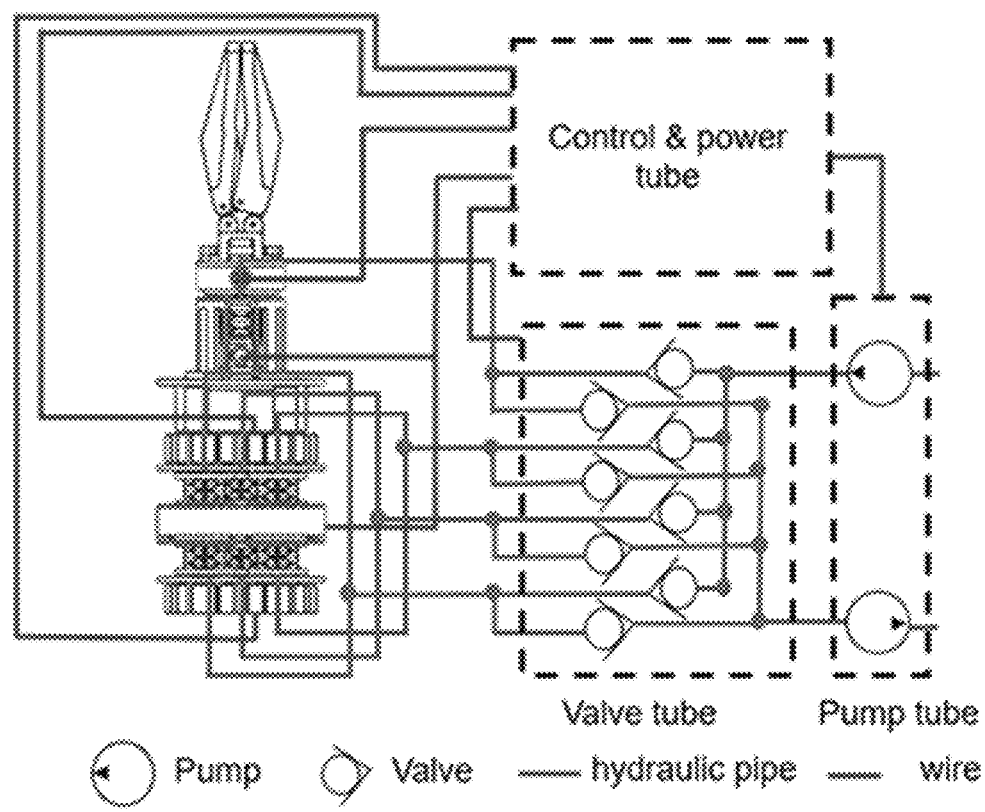
FIG. 4d is a schematic drawing of the hydraulic control system in accordance with an embodiment.
Figure 4E:
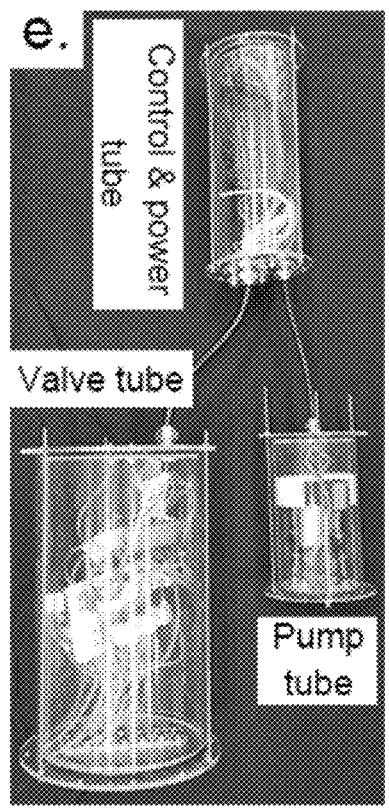
FIG. 4e depicts a hydraulic control system in accordance with an embodiment.

The underwater manipulator was controlled by the hydraulic control system shown in FIG. 4d and FIG. 4e. The hydraulic system consists of eight valves, two pumps, and one control unit. For the sake of waterproofing and compactness, all the electronic components are put into acrylic tubes. Six actuators on the joint correspond to six valves, and each valve is connected with two coupled actuators. The rest two valves are for the actuator on the gripper.

Gripping Force & Joint Test

Figure 4F:
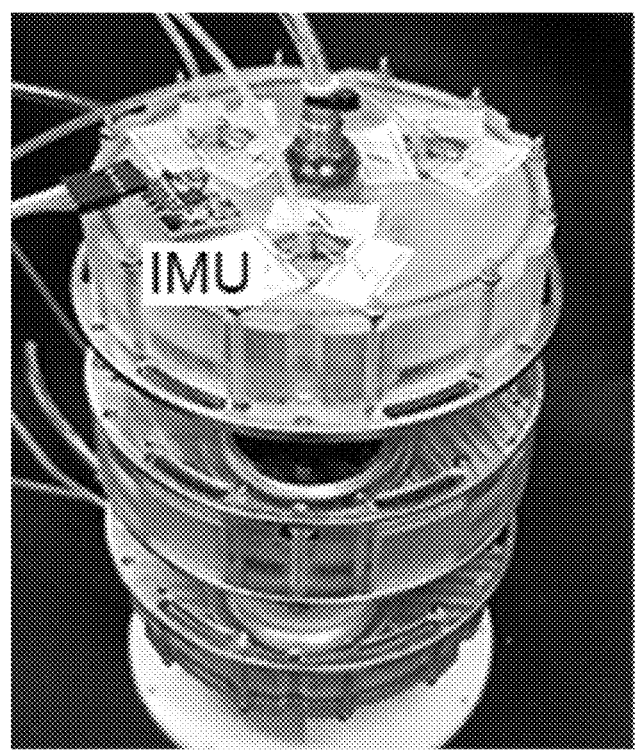
FIG. 4f depicts the gripping force test setup.
Figure 4G:
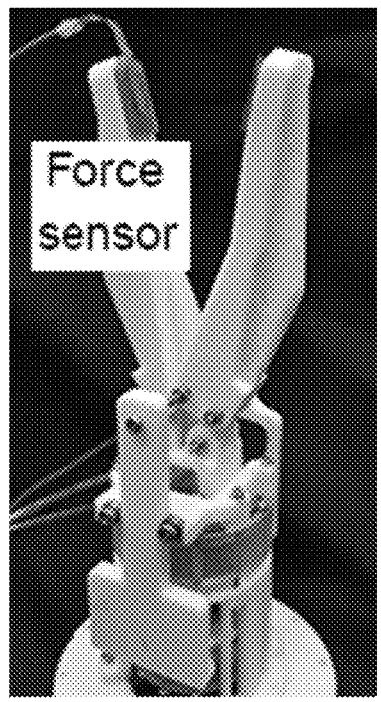
FIG. 4g depicts the hybrid underwater manipulator joint test setup.
Figure 4H:
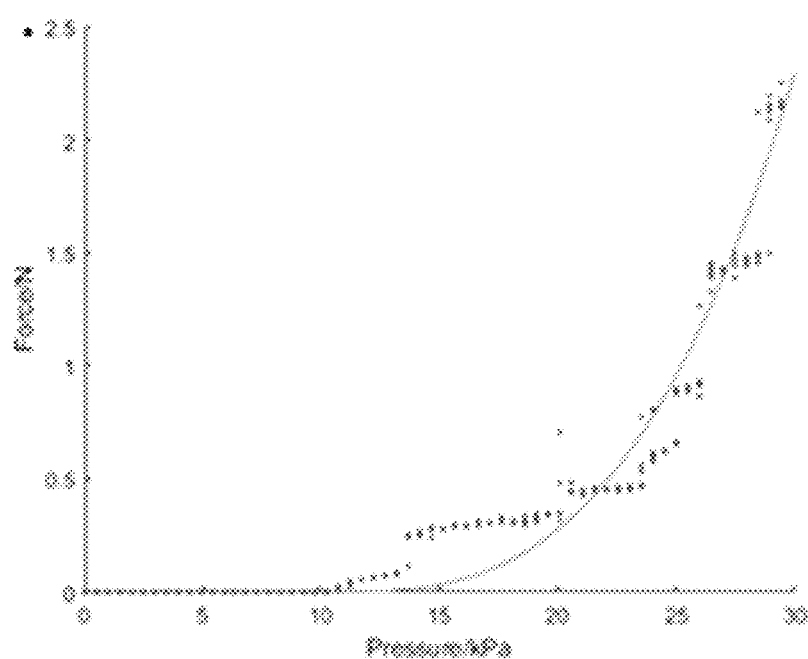
FIG. 4h is a graphical illustration of Gripping force test results.

The gripper's gripping force was first tested. The testing setup is shown in FIG. 4g. A force sensor (FSR400, Interlink Electronics) was mounted at the tip of the gripper. As shown in FIG. 4h, the gripping force reached about 2.3 N when pressure was 30 kPa.

Figure 4I:
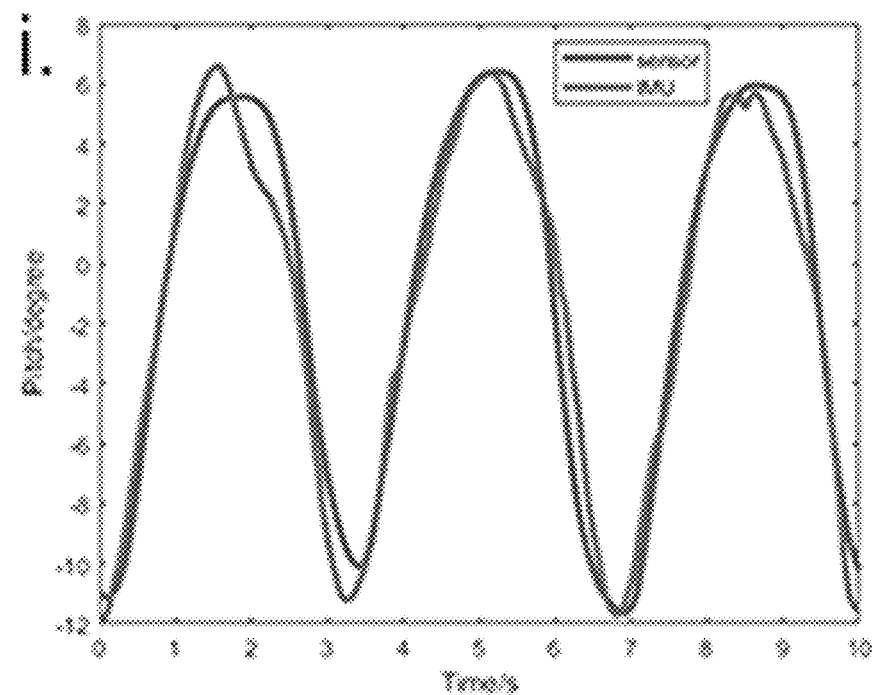
FIG. 4i is a graphical illustration of Joint test results for pitch.
Figure 4J:
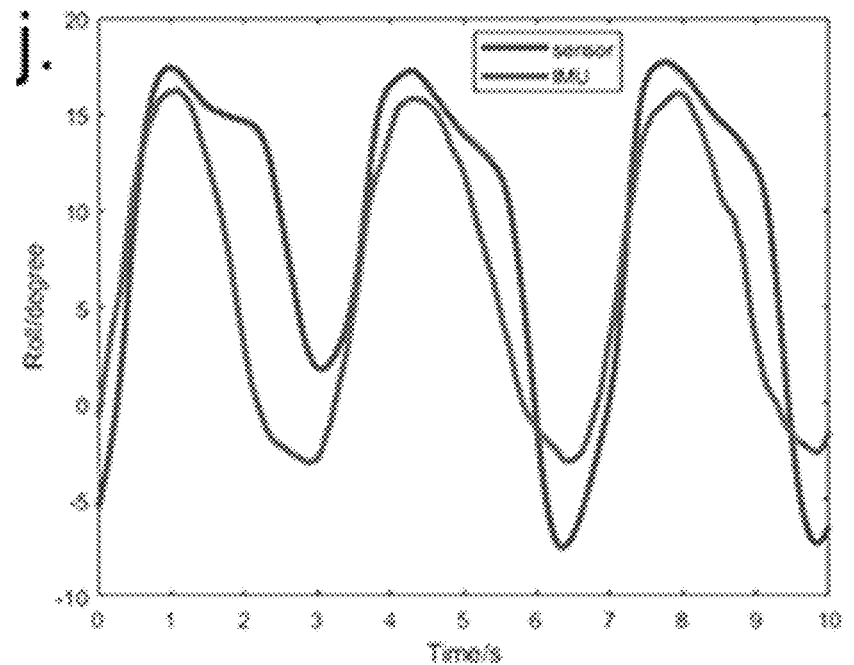
FIG. 4j is a graphical illustration of Joint test results for roll.

As illustrated in the last section, giving three critical angle, the orientation of one SOFA can be calculated. In the manipulator's joint, the normal vector of each section is in parallel with the corresponding SOFA. In other words, one section's orientation can be obtained by only one of the three SOFAs. The redundant sensing feedback could largely increase system robustness and accuracy. In order to validate the position feedback, an IMU was mounted on the top photodiode tube and used as a reference (FIG. 4f). The testing results were shown in FIG. 4i and FIG. 4j. The RMSE of pitch was 1.34° and the RMSE of roll is 5.1°.

Hybrid Underwater Manipulator Validation

Figure 5:
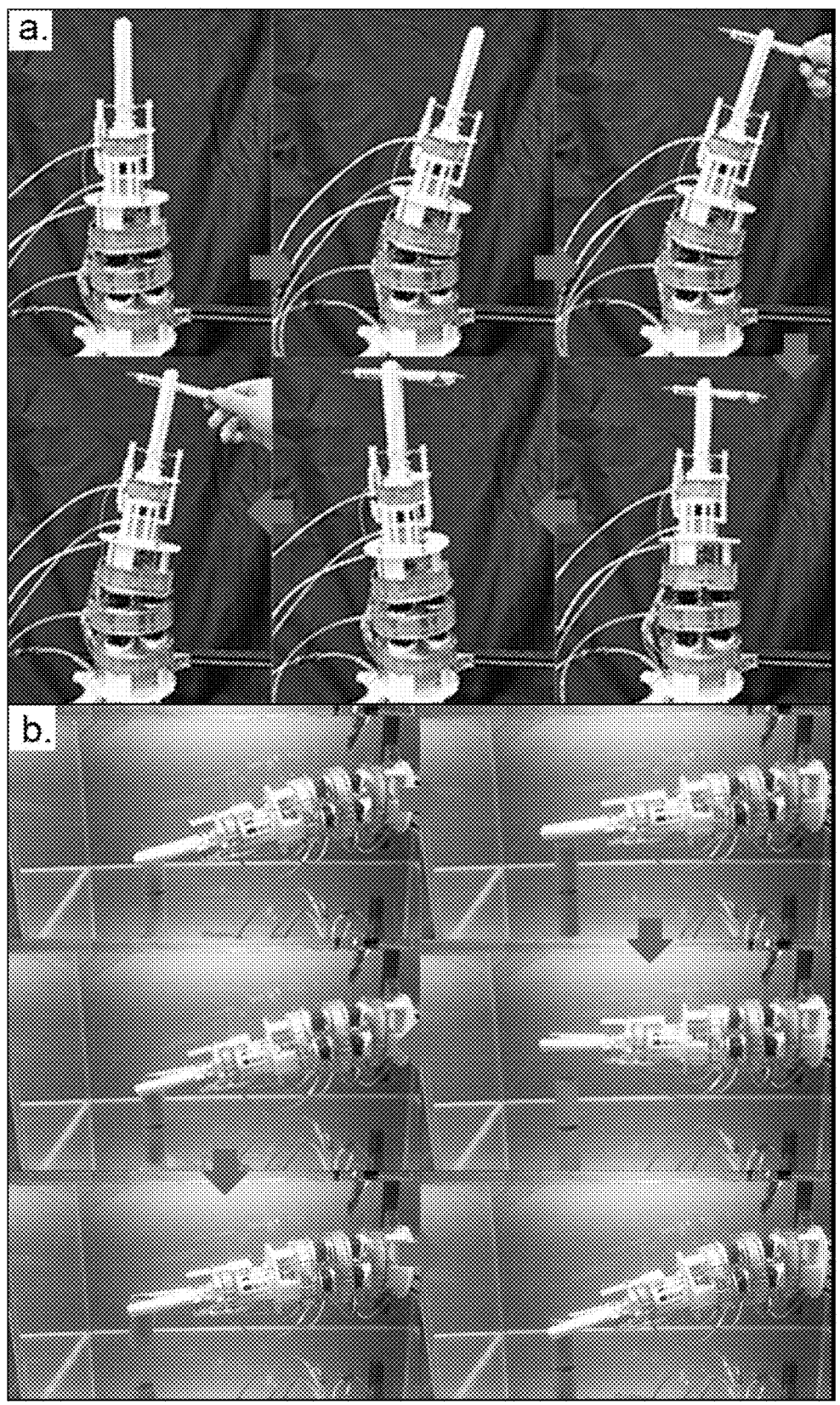
FIG. 5a depicts an on shore manipulator test and FIG. 5b depicts a pick & place test in a water tank.

A serious of tests were carried out to test the hybrid underwater manipulator's performance. The hybrid underwater manipulator was first mounted on a fixed platform and perform different tasks both on shore and underwater. In the on shore test (FIG. 5a), the manipulator was mounted vertically and was controlled to grab a pen from one operator, rotate count clockwise and return the pen to the operator. In the water tank test (FIG. 5b), the manipulator was controlled to perform one pick-and-place task of a cylindrical object.

Omni-Directional Underwater Platform

The underwater platform (FIG. 6b) is controller by 7 motors and is capable of moving omni-directionally. Compared with most existing underwater platforms that use cubic frame, triangular motion frames are used for the underwater platform, in which case the overall weight can be reduced while thrust force and load capacity can remain the same. In total 7 motors were used to control 6 DOFs (FIG. 6a): Three horizontal motors provide propulsion alone x axis and y axis; three vertical motors provide propulsion alone z axis, pitch and roll; the last motor mounted on the center provide yaw.

Validation Test of the Integrated Underwater Platform

Figure 6:
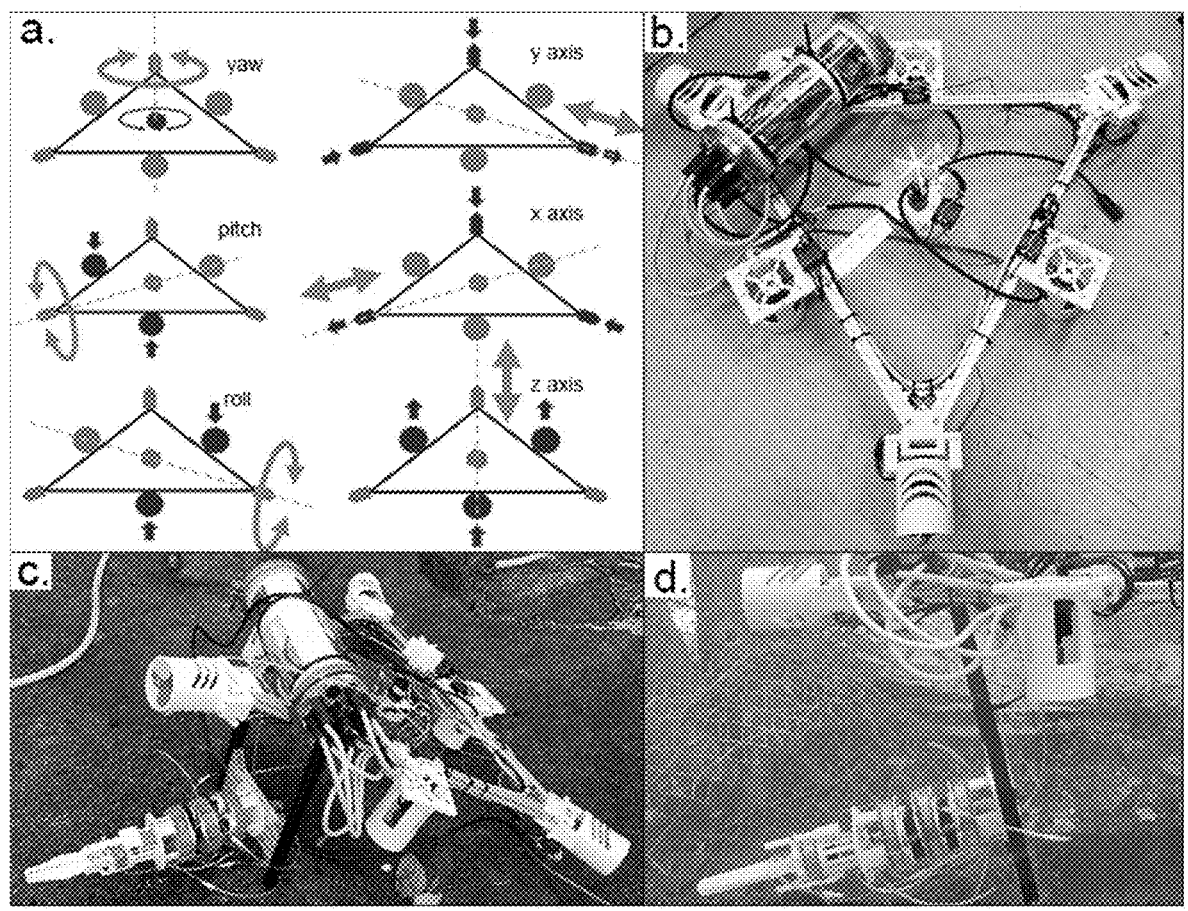
FIG. 6a Underwater platform orientation corresponds to motors.
FIG. 6b depicts the proposed omni-directional underwater platform.
FIG. 6c depicts the underwater platform mounted with the underwater manipulation system.
FIG. 6d depicts the whole system tested in a water tank.

The manipulator system was mounted on an underwater platform and tested in a water tank. As shown in FIG. 6c, the manipulator was mounted underneath the underwater platform. The connecting bar was 50 cm to prevent interference between the manipulator and the platform. Neutral buoyancy can be obtained by applying weights alone the triangle frame and validation test was carried out in a water tank (FIG. 6d).

A hybrid underwater manipulator, along with soft origami actuator and embedded optical waveguide was proposed in this paper. Taking advantage of the distinct structure of the soft origami actuator, bending and stretching motion was firstly separated on the actuator level. Also, as the pattern of embedded optical waveguide made it closely attach to the soft origami actuator's surface, bending and stretching were further decoupled on the sensor level. The new novel optical sensing approach requires only one core layer for waveguide, largely reduces fabrication complexity and cost. The feasibility of this approach was also validated. The soft origami fluidic actuator with embedded optical waveguide SOFA was tested as a single unit and components of one joint and the results showed small RMSE. At last, the hybrid underwater manipulator successfully carried different tasks on shore, in a water tank, and on an underwater platform.

Unless otherwise indicated in the examples and elsewhere in the specification and claims, all parts and percentages are by weight, all temperatures are in degrees Centigrade, and pressure is at or near atmospheric pressure.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of ingredients, reaction conditions, etc., used in the specification and claims are to be understood as modified in all instances by the term "about."

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A device for underwater applications, comprising:
a photodiode tube;
an LED tube;
a soft origami fluidic actuator that is extendable and compressible along a longitudinal axis,
wherein the soft origami fluidic actuator is axially disposed between the photodiode tube at a first axial end of the soft origami fluidic actuator and the LED tube disposed at a second axial end of the soft origami fluidic actuator that is disposed opposite the first axial end;
a plurality of optical waveguides each arranged external to the soft origami fluidic actuator and configured to follow motion of the soft origami fluidic actuator along the longitudinal axis,
wherein the plurality of optical waveguides are configured, and arranged relative to the soft origami fluidic actuator, to buckle into geometric concavities of the soft origami fluidic actuator in response to compression of the soft origami fluidic actuator along the longitudinal axis; and
a plurality of sensors configured to obtain an optical signal from the plurality of optical waveguides.

2. The device for underwater applications according to claim 1, wherein each of the plurality of optical waveguides comprises a core layer comprising transparent silicone rubber.

3. The device for underwater applications according to claim 1, wherein at least one of the plurality of sensors is an optical sensor.

4. The device for underwater applications according to claim 1, further comprising a hydraulic control system and gripper.

5. The device for underwater applications according to claim 1, wherein the plurality of optical waveguides are axially disposed and axially compressible between the photodiode tube and the LED tube.

6. The device for underwater applications according to claim 1, comprising three optical waveguides that are each configured, and arranged relative to the soft origami fluidic actuator, to buckle into different geometric concavities, of the geometric concavities of the soft origami fluidic actuator, in response to compression of the soft origami fluidic actuator along the longitudinal axis.

7. The device for underwater applications according to claim 6, wherein the three optical waveguides are arranged relative to the soft origami fluidic actuator to be in contact with water in response to submergence of the device, and wherein each of the three optical waveguides is disposed absent any cladding layer along any length thereof that is exposed to the water.

8. The device for underwater applications according to claim 1, wherein opposite side portions of the soft origami fluidic actuator, each extending along the longitudinal axis, are non-symmetrical to one another.

9. The device for underwater applications according to claim 1, wherein the soft origami fluidic actuator comprises three portions contiguous with one another and extending circumferentially around and along the longitudinal axis, wherein each of the three portions comprises a different overall geometric shape along the longitudinal axis.

10. The device for underwater applications according to claim 9, wherein, in a rest state of the device, centers of geometric concavities, of the geometric concavities, at each of the three portions, is spaced along the longitudinal axis from centers of geometric concavities at each of the other two portions.

11. An underwater robot, comprising:
a photodiode tube;
an LED tube;
a soft origami fluidic actuator that is extendable and compressible along a longitudinal axis,
wherein the soft origami fluidic actuator is axially disposed between the photodiode tube at a first axial end of the soft origami fluidic actuator and the LED tube disposed at a second axial end of the soft origami fluidic actuator that is disposed opposite the first axial end;
a plurality of optical waveguides each arranged external to the soft origami fluidic actuator and configured to follow motion of the soft origami fluidic actuator along the longitudinal axis,
wherein the plurality of optical waveguides are configured, and arranged relative to the soft origami fluidic actuator, to buckle into geometric concavities of the soft origami fluidic actuator in response to compression of the soft origami fluidic actuator along the longitudinal axis; and
a plurality of sensors configured to obtain an optical signal from the plurality of optical waveguides.

12. The underwater robot according to claim 11, wherein each of the plurality of optical waveguides comprises a core layer comprising transparent silicone rubber and is disposed absent any cladding layer along any length thereof along the longitudinal axis.

13. The underwater robot according to claim 11, wherein at least one of the plurality of sensors is an optical sensor.

14. The underwater robot according to claim 11, further comprising a hydraulic control system and gripper.

15. The underwater robot according to claim 11, wherein the plurality of optical waveguides are axially disposed and axially compressible between the photodiode tube and the LED tube.

16. The underwater robot according to claim 11, comprising three optical waveguides that are each configured, and arranged relative to the soft origami fluidic actuator, to buckle into different geometric concavities, of the geometric concavities of the soft origami fluidic actuator, in response to compression of the soft origami fluidic actuator along the longitudinal axis.

17. The underwater robot according to claim 16, wherein the three optical waveguides are arranged relative to the soft origami fluidic actuator to be in contact with water in response to submergence of the device, and
    wherein each of the three optical waveguides is disposed absent any cladding layer along any length thereof that is exposed to the water.

18. The underwater robot according to claim 11, wherein opposite side portions of the soft origami fluidic actuator, each extending along the longitudinal axis, are non-symmetrical to one another.

19. The underwater robot according to claim 11, wherein the soft origami fluidic actuator comprises three portions contiguous with one another and extending circumferentially around and along the longitudinal axis, wherein each of the three portions comprises a different overall geometric shape along the longitudinal axis.

20. The underwater robot according to claim 19, wherein, in a rest state of the device, centers of geometric concavities, of the geometric concavities, at each of the three portions, is spaced along the longitudinal axis from centers of geometric concavities at each of the other two portions.

* * * * *